US009557936B2

(12) United States Patent
Anderson et al.

(10) Patent No.: US 9,557,936 B2
(45) Date of Patent: Jan. 31, 2017

(54) PROTECTION OF MEMORIES, DATAPATH AND PIPELINE REGISTERS, AND OTHER STORAGE ELEMENTS BY DISTRIBUTED DELAYED DETECTION AND CORRECTION OF SOFT ERRORS

(71) Applicant: Texas Instruments Incorporated, Dallas, TX (US)

(72) Inventors: Timothy D. Anderson, University Park, TX (US); Joseph Zbiciak, Farmers Branch, TX (US); Abhijeet A. Chachad, Plano, TX (US); Kai Chirca, Dallas, TX (US); Naveen Bhoria, Plano, TX (US); David M. Thompson, Dallas, TX (US); Jonathan (Son) Hung Tran, Murphy, TX (US); Ramakrishnan Venkatasubramanian, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 52 days.

(21) Appl. No.: 14/587,234

(22) Filed: Dec. 31, 2014

(65) Prior Publication Data

US 2016/0188408 A1    Jun. 30, 2016

(51) Int. Cl.
*G06F 11/10*     (2006.01)
*G06F 3/06*      (2006.01)

(52) U.S. Cl.
CPC .............. *G06F 3/0673* (2013.01); *G06F 3/064* (2013.01); *G06F 3/0619* (2013.01)

(58) Field of Classification Search
CPC .................................................. G06F 11/1008
USPC ...................... 714/763, 784, 701, 163, 15, 11
See application file for complete search history.

(56) References Cited

U.S. PATENT DOCUMENTS

| 3,840,861 | A | * | 10/1974 | Amdahl | ................ | G06F 9/3867 |
| | | | | | | 712/E9.062 |
| 4,445,177 | A | * | 4/1984 | Bratt | ........................ | G06F 8/41 |
| | | | | | | 712/245 |
| 2003/0218816 | A1 | * | 11/2003 | Katoh | ................ | G11B 20/1833 |
| | | | | | | 360/53 |
| 2006/0133160 | A1 | * | 6/2006 | Dickin | ................ | G06F 11/1004 |
| | | | | | | 365/189.05 |

* cited by examiner

*Primary Examiner* — Fritz Alphonse
(74) *Attorney, Agent, or Firm* — Robert D. Marshall, Jr.; Charles A. Brill; Frank D. Cimino

(57) ABSTRACT

This invention is data processing apparatus and method. Data is protecting from corruption using an error correction code by generating an error correction code corresponding to the data. In this invention the data and the corresponding error correction code are carried forward to another set of registers without regenerating the error correction code or using the error correction code for error detection or correction. Only later are error correction detection and correction actions taken. The differing data/error correction code registers may be in differing pipeline phases in the data processing apparatus. This invention forwards the error correction code with the data through the entire datapath that carries the data. This invention provides error protection to the whole datapath without requiring extensive hardware or additional time.

15 Claims, 10 Drawing Sheets

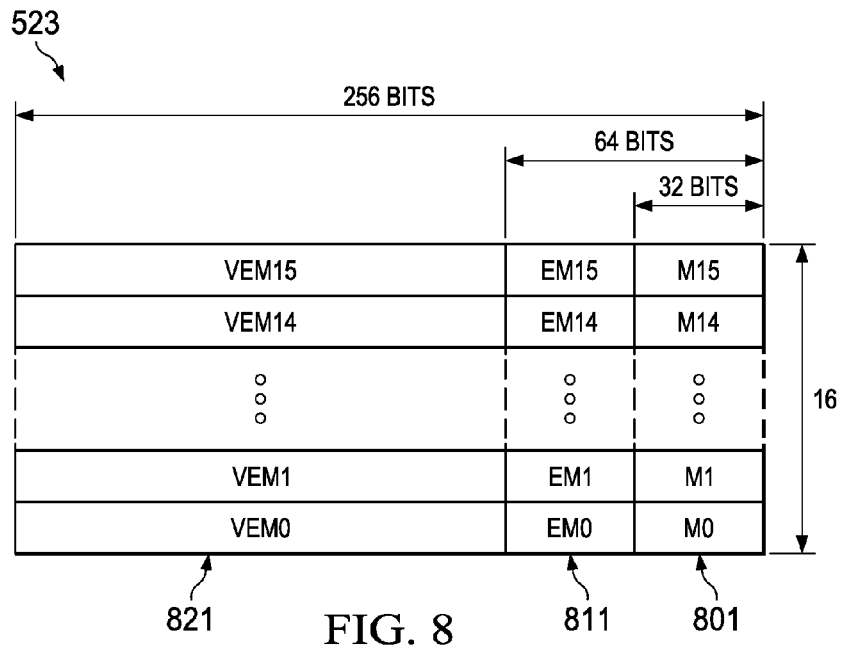
FIG. 8
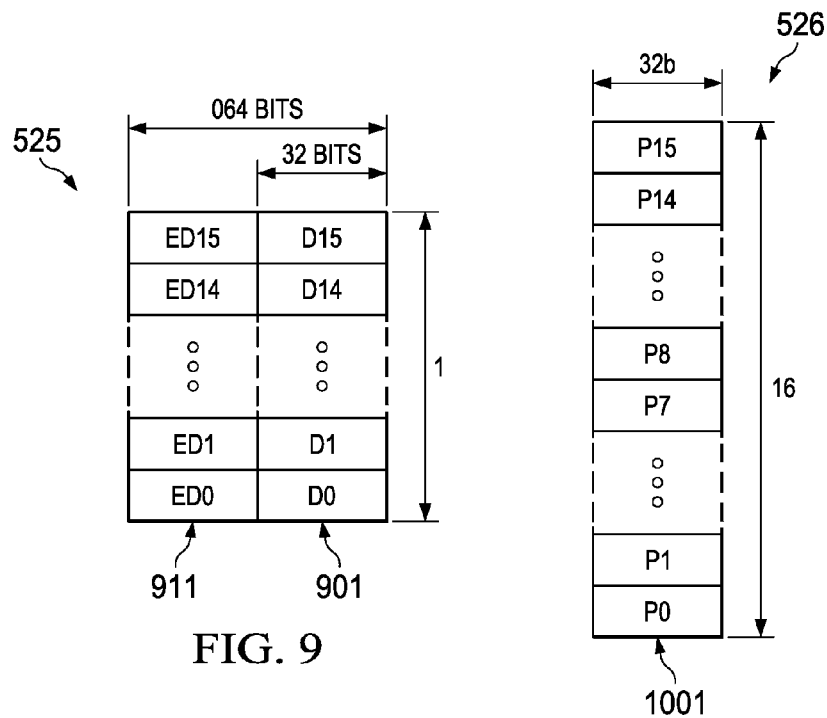
FIG. 9
FIG. 10

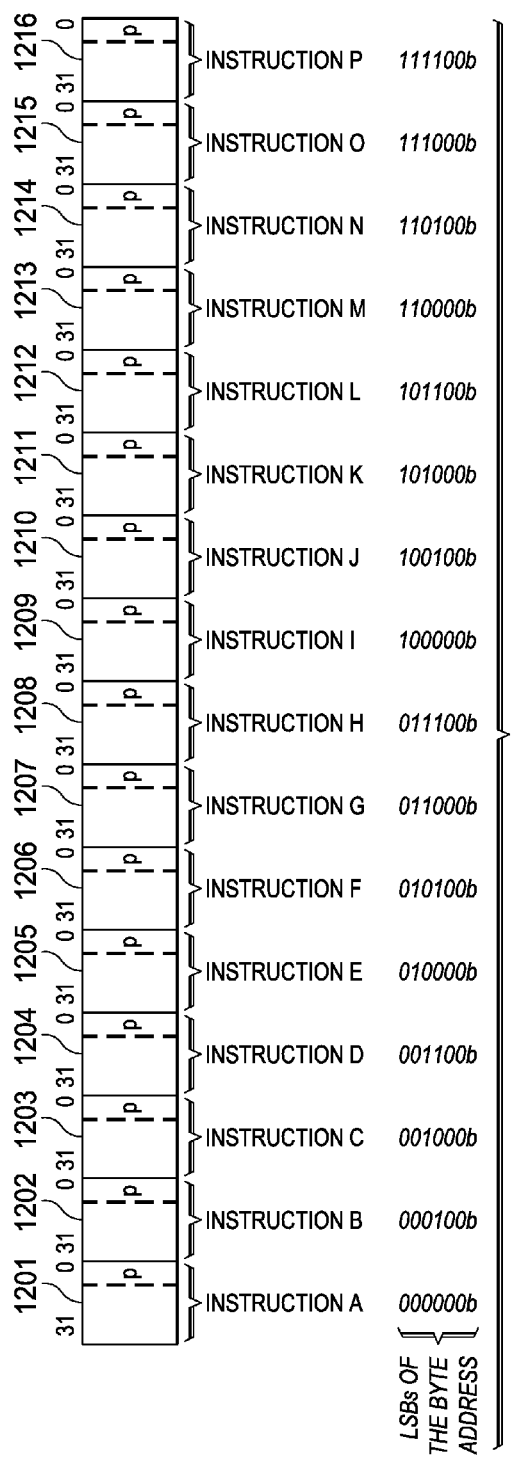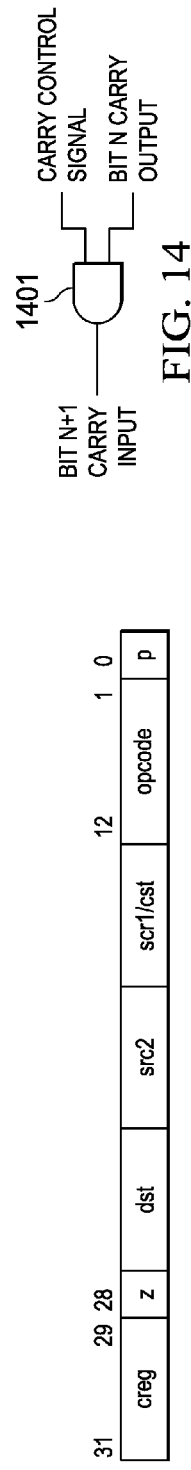

PROTECTION OF MEMORIES, DATAPATH AND PIPELINE REGISTERS, AND OTHER STORAGE ELEMENTS BY DISTRIBUTED DELAYED DETECTION AND CORRECTION OF SOFT ERRORS

TECHNICAL FIELD OF THE INVENTION

The technical field of this invention is digital data processing and more specifically digital data error detection and correction.

BACKGROUND OF THE INVENTION

Memories and registers are exposed to radiation that can introduce soft errors in both the memory bit cells and the flip flops. This causes the content of the memory or the flip flops to be corrupted, which often causes device failure. The probability of such a soft error corruption in flip flop increases with increased integration and smaller manufacturing technologies. The percentage of FIT rate (Failure in Time over billion seconds) that is directly related to such soft error corruption in the flip flops is on the rise.

Conventional solutions to this problem include adding ECC (Error Correction Code) to the memory bit cells. This requires extra hardware logic to detect and correct errors on every read to the memory. This logic adds to the latency of memory accesses causing an overall degradation in performance. Conventional solutions for errors in discrete registers includes using specially designed and radiation hardened flip flops or using flip flops with ECC or parity built into them. Each of these conventional solutions adds gates to the flip flop and has a negative impact on the area and speed of the design.

SUMMARY OF THE INVENTION

This invention is data processing apparatus and method. Data is generally protecting from corruption using an error correction code. This includes generating an error correction code corresponding to the data. The data and the corresponding error correction code are stored in corresponding data registers. The data and the corresponding error correction code are transferred to another set of registers without regenerating the error correction code or using the error correction code for error detection or correction. Only upon reaching a subsequent register set are error correction detection and correction actions taken. The differing data/error correction code registers may be in differing pipeline phases in the data processing apparatus.

Existing solutions apply the detection and correction logic only at the point when the data is read. The error correction code is not carried forward with the data and is lost. This provides no protection for that data from that point until the error correction code is recomputed. This invention forwards the error correction code with the data through the entire datapath that carries the data.

This invention does not need any special cells for the registers. This invention does not need multiple detection and correction or syndrome generation hardware. Registers throughout the datapath get soft error protection. This protection is of the same quality as the protection of memories. This has a very positive impact on the soft error protection of the device. The cycles spent in detection and correction at every level are avoided. This avoids any area or performance impact of adding ECC protection at every level.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

FIG. 12 illustrates sixteen instructions of a single fetch packet;

FIG. 13 illustrates an example of the instruction coding of instructions used by this invention;

FIG. 14 illustrates the carry control for SIMD operations according to this invention;

DETAILED DESCRIPTION OF PREFERRED EMBODIMENTS

Figure 1:
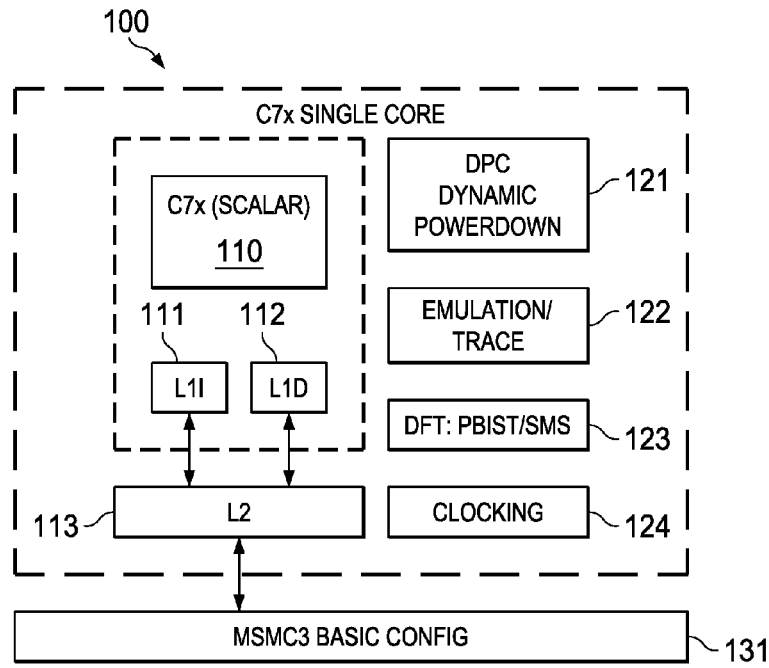
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
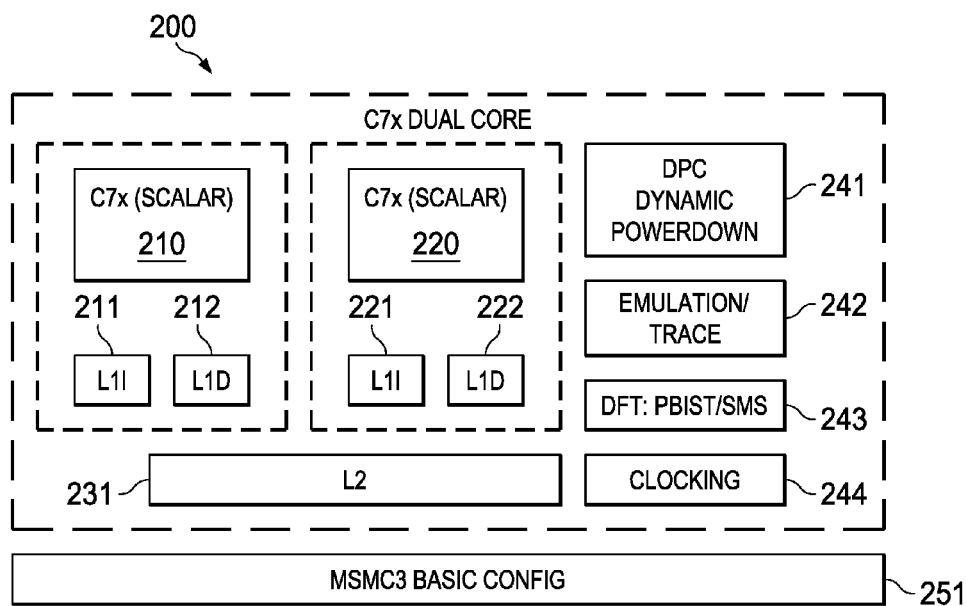
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
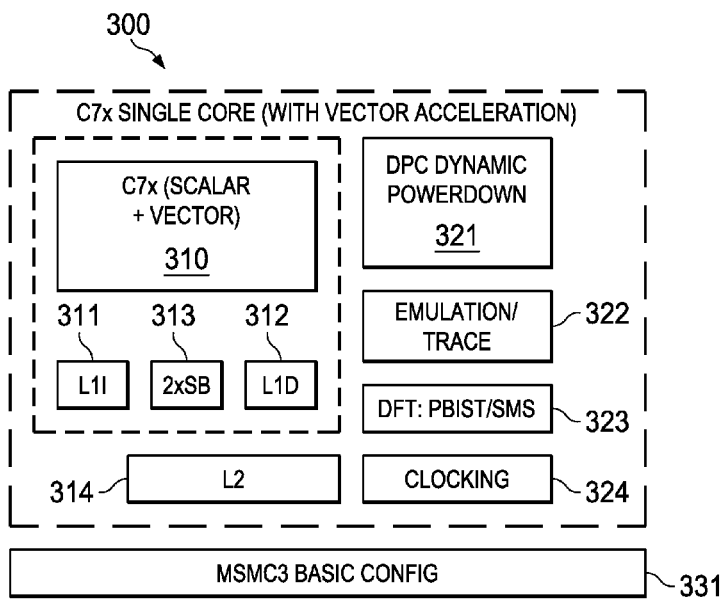
FIG. 3 illustrates a single core vector processor according to a further embodiment of this invention.
Figure 4:
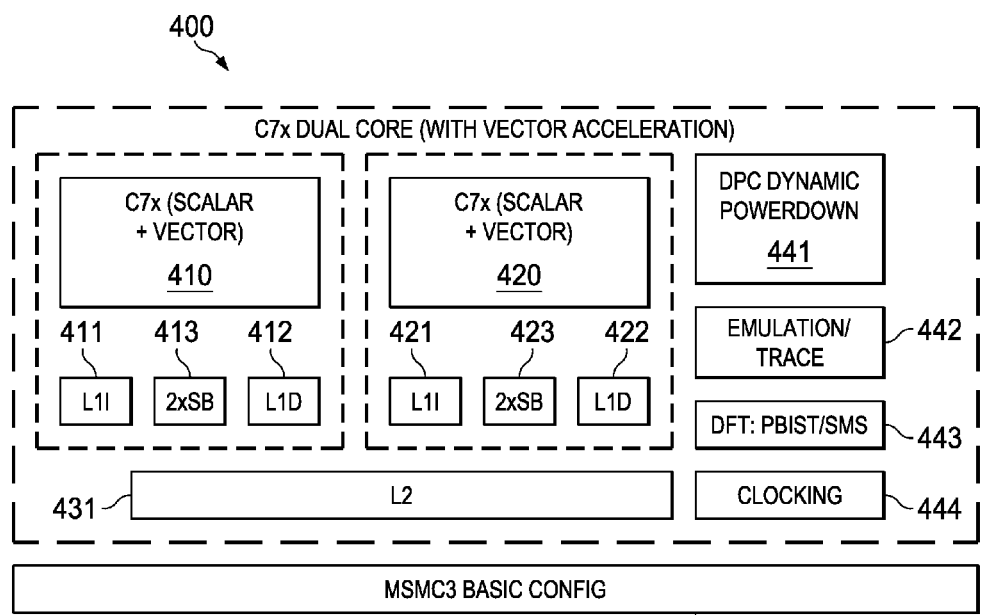
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
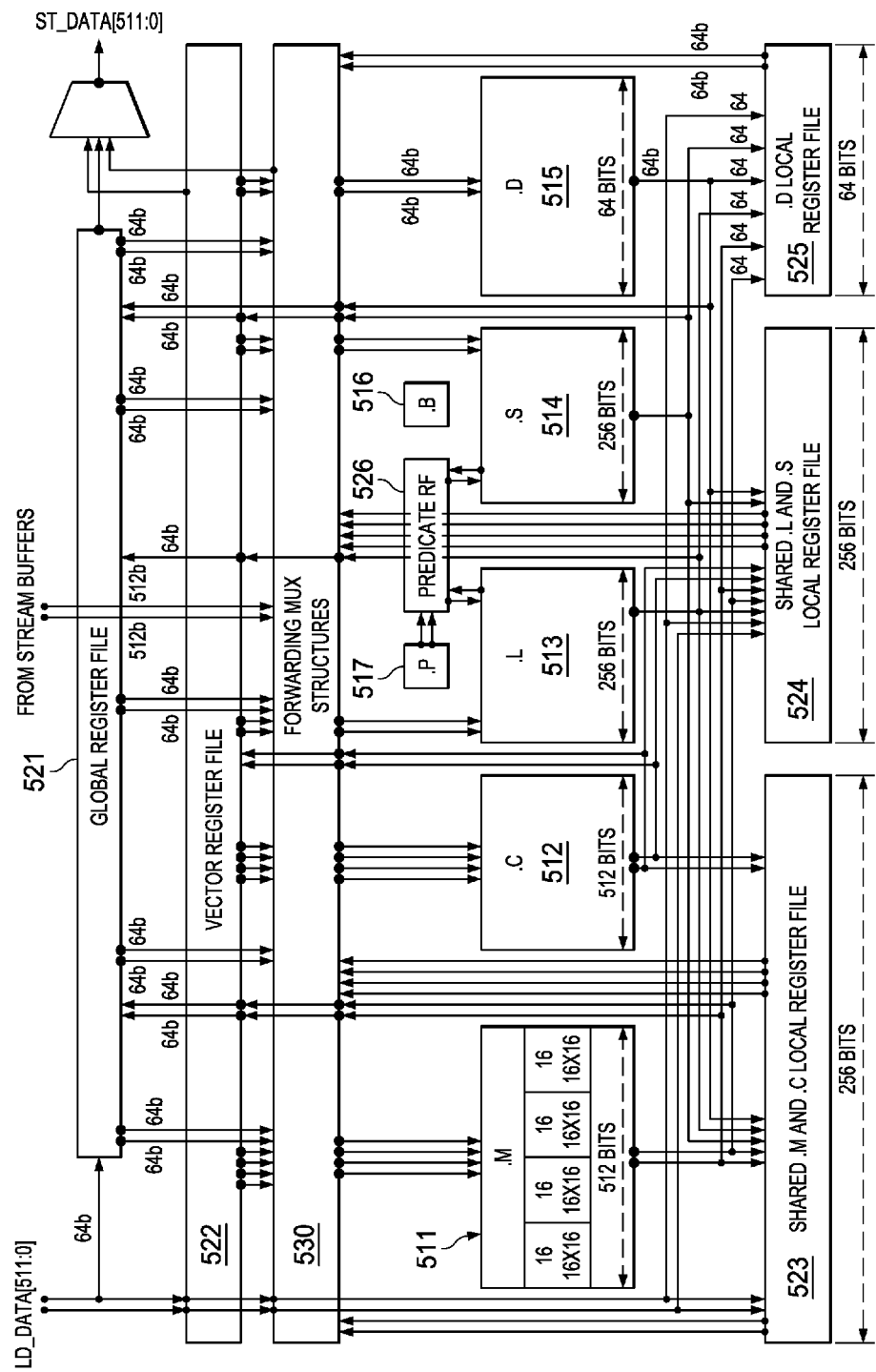
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
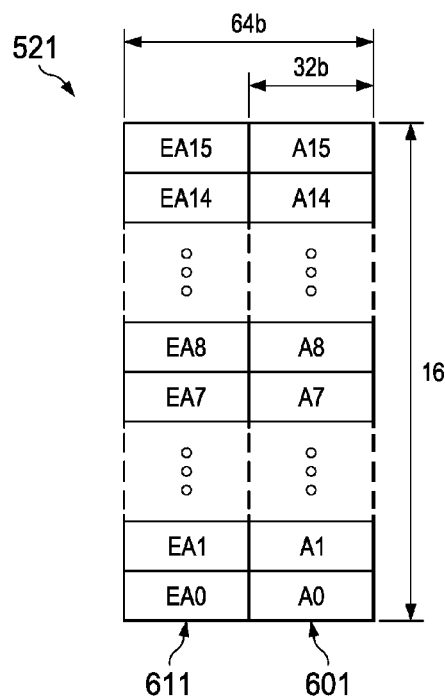
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
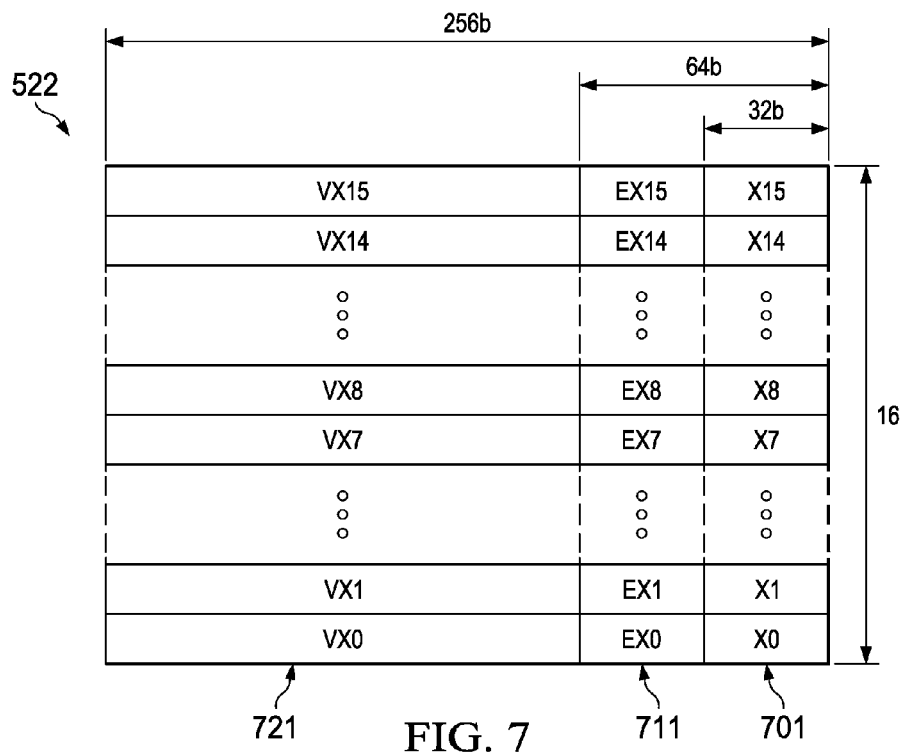
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |

TABLE 1-continued

| Instruction Designation | Register Accessed |
|---|---|
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
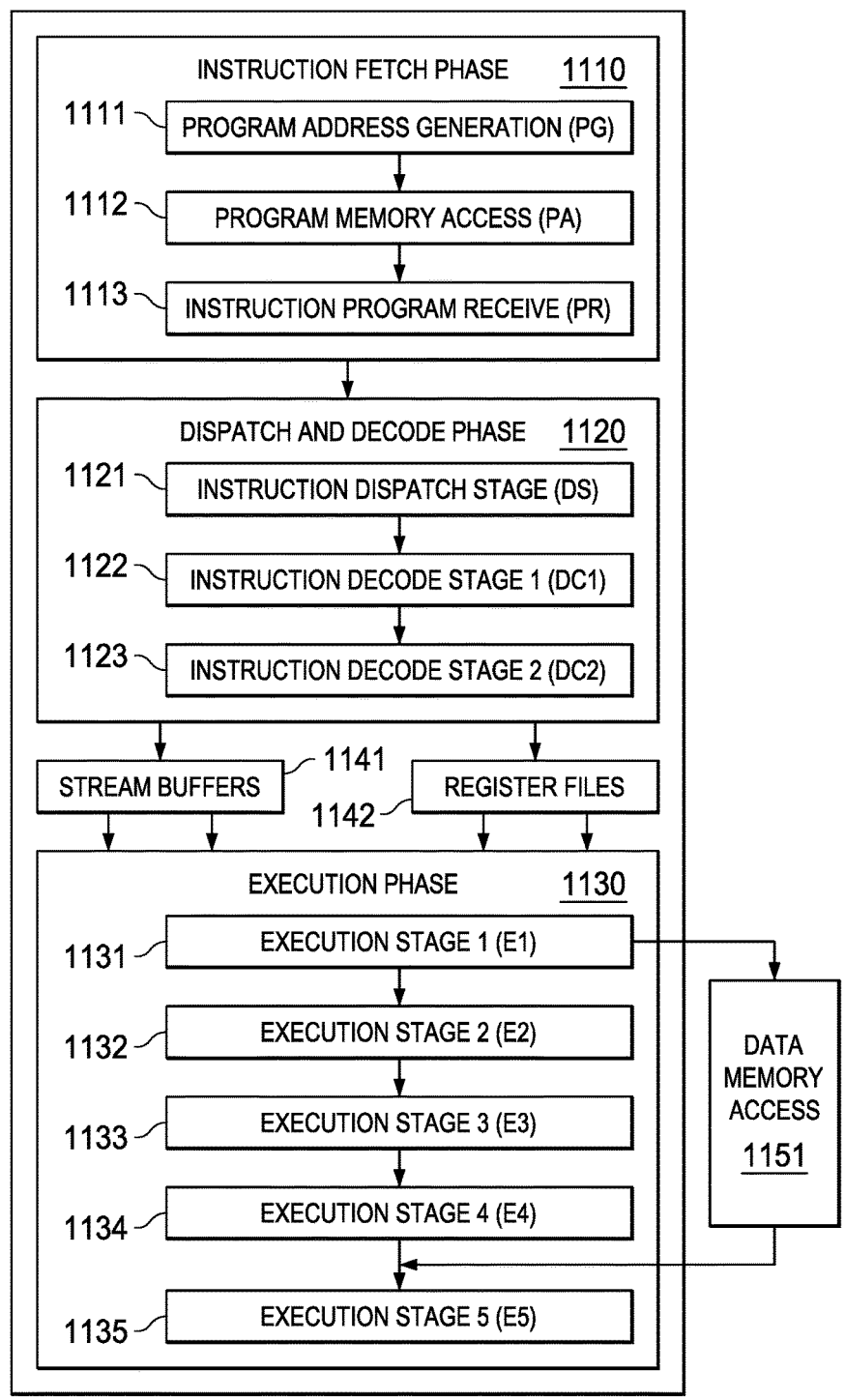
FIG. 11 illustrates the pipeline phases of the central processing unit according to a preferred embodiment of this invention.

FIG. 11 illustrates the following pipeline phases: program fetch phase 1110, dispatch and decode phase 1120 and execution phase 1130. Program fetch phase 1110 includes three stages for all instructions. Dispatch and decode phase 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I.

Therefore program access stage 1112 (PA) can take several clock cycles instead of 1 clock cycle as in the other stages.

Dispatch and decode phase 1120 include instruction dispatch to appropriate execution unit stage 1121 (DS), instruction pre-decode stage 1122; (DC1); and instruction decode, operand reads stage 1223 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
|---|---|
| 8 bits | -000 0000 0000 0000 0000 0000 0000 0000 |
| 16 bits | -101 0101 0101 0101 0101 0101 0101 0101 |
| 32 bits | -111 0111 0111 0111 0111 0111 0111 0111 |

TABLE 4-continued

| Data Size | Carry Control Signals |
|---|---|
| 64 bits | -111 1111 0111 1111 0111 1111 0111 1111 |
| 128 bits | -111 1111 1111 1111 0111 1111 1111 1111 |
| 256 bits | -111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Memories and datapath registers in the preferred embodiment of this invention are protected from soft errors by ECC syndrome codes. The syndrome is not re-generated at every level where this data is accessed. Instead, the syndrome is passed along with the data to the next pipeline stage. The ECC syndrome is not re-generated every time the data is written, nor is the syndrome decoded for error detection and correction every time the data is read or accesses. The syndrome keeps getting passed along with the data through the system. Detection and correction are performed at the furthest level from the memory. This is usually the point at which the data is consumed or the last level cache. Thus any errors introduced at any point between the memory and the point at which the syndrome is used are corrected. This includes all the datapath registers, register files, discrete registers and any other intermediate data storage elements. Pipeline and datapath registers get ECC protection without the area and performance impact of conventional ECC detection and correction by transporting the syndrome along with data to the endpoint.

Doing detection and correction at every level would require additional cycles to accomplish. This would degrade performance. The preferred embodiment of this invention avoids those additional cycles by doing the detection and correction at just one point. One advantage is that this enables current pipelines to stay unchanged. Another advantage is this supports ECC with zero additional cycles. This is achieved by doing the detection and correction closest to the CPU or when the granularity of the parity bits or ECC syndrome changes.

The following is an example to describe this invention. In this example a CPU Read misses all levels of cache and hits the last level memory or cache. In this example the last level cache or memory has the syndrome along with data. In conventional architectures, a controller would decode the syndrome, detect any possible errors in the data and correct it. However, in this invention the syndrome is passed along with data to the next level of cache. Note that any soft error that may have been introduced in the memory remains uncorrected. This syndrome stays with the data all the way up to the CPU. The data and the corresponding syndrome passes through a number of interface and pipeline registers and stays in multiple queues. The data ultimately reaches and is consumed by the CPU. The data may also be cached or stored locally in a memory before it reaches the CPU. A soft error could be introduced in any of the registers and flip-flops when the data is present or in any of the cache or memories. This data reaches the CPU with the syndrome. In this example the CPU will decode the syndrome at that point and execute the detection and correction logic. Since the syndrome has stayed with the data, it qualifies the data and has protection built in to detect and correct errors.

The same strategy is employed when data get written out from the CPU. The syndrome calculated by the CPU stays with the data. The syndrome is used for detection and correction when that data is consumed. Since CPU is not the only originator or consumer of data in the system, this strategy is used in multiple cases. These include but are not restricted to cache evictions and DMA's originated within the module.

Figure 15:
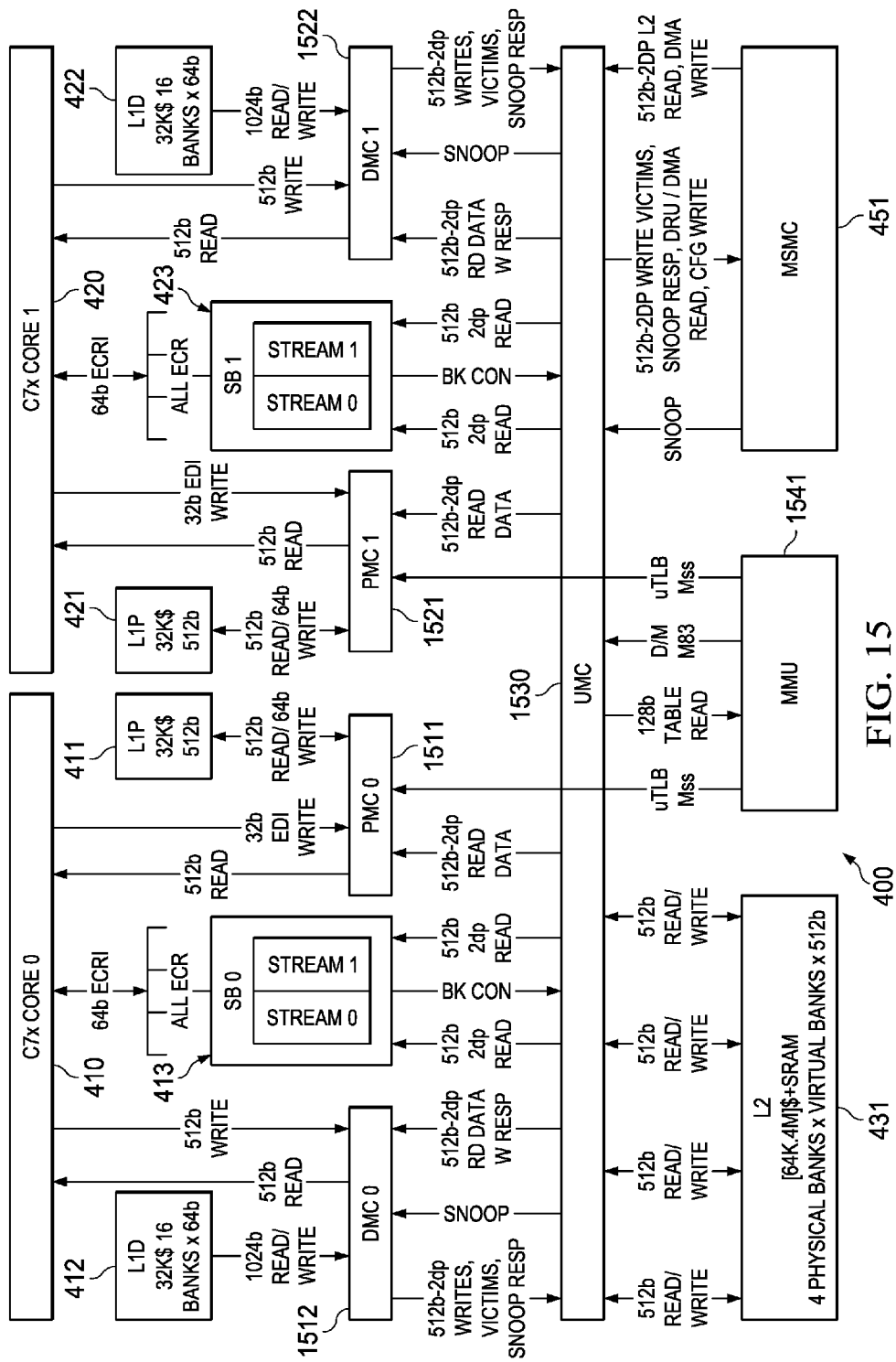
FIG. 15 illustrates another view of dual core vector processor emphasizing the cache controllers.

FIG. 15 illustrates another view of dual core vector processor 400. This view in FIG. 15 emphasizes cache controllers: program memory controllers 1511 and 1521 controlling data transfer to and from level 1 program caches 411 and 421; data memory controllers 1512 and 1522 controlling data transfer into and out of level 1 data caches 412 and 422. FIG. 15 also illustrates unified memory controller 1530 controlling data transfers to and from level two (L2) cache 431. As illustrated in FIGS. 4 and 15 L2 cache 431 is shared between the DSP cores 410 and 420.

FIG. 15 shows the interfaces between the various blocks. The dual core vector processor 400 consists of: two CPU cores 410 and 420; two L1 program cache controllers (PMC) 1511 and 1521, each with its private 32 KB L1I cache 411 and 421; two L1 data cache controllers (DMC) 1512 and 1522, each with its private 32 KB L1D cache 412 and 422; two Stream Buffers (SB) 413 and 423, each with two streams; L2 Unified Cache Controller (UMC) 1530, with a shared L2 cache and SRAM 431 up to 2M bytes.

The memory system illustrated in FIG. 15 is the next generation caches and memory controller system for fixed and floating point DSP. The preferred embodiment can provide bandwidth of up to 2048-bits of data per cycles. The IAD caches 412 and 422 can sustain 512-bits of data to each CPU (410, 420) every cycle, while the L2 cache 431 can provide 1024-bits of data to each stream buffer (413, 423) every cycle. The L1 and L2 controllers have the ability to queue up multiple transactions out to the next level of memory, and can handle out of order data return. The L1P controllers 411 and 412 support branch exit prediction from the CPU and can queue up multiple prefetch misses to L2 431.

This memory system has full soft error correction (ECC) on its data and TAG rams. This novel ECC scheme cover many pipeline and interface registers, in addition to memories. This memory system support full memory coherency, where all the internal caches and memories (L1, L2) are kept coherent to each other and external caches and memories (MSMC, L3, DDR). The shared L2 controller keeps the multiple L1D's attached to it coherent to each other, and to the next level of caches (L2, L3, etc.)

This memory system supports virtual memory, and includes as part of it address translation, micro-table lookaside buffers (µTLBs), L2 page table walk, L1P cache invalidates and DVM messages. The shared L2 controller can support up to two stream buffers, each with two streams. The stream buffers are kept coherent to the L1D cache, and have a pipelined high bandwidth interface to L2.

The L1D cache is backed up by a victim cache, has a larger cache line size (128-bytes), and implements aggressive write merging. New features include Look-up table, Histogram, and Atomic accesses. Cache changes in the L1P include higher associativity (4-way), and a larger cache line size (64-bytes). The L2 cache also features higher associativity (8-ways).

The data paths include: CPU-DMC 512-bit Read and 512-bit Write; CPU-PMC 512-bit Read and 32-bit Emulation Write; DMC-UMC 512-bit Read, 512-bit Write interfaces, that can do cache transactions, snoop and configuration accesses handling 2 dataphase transactions; PMC-UMC 512-bit Read, which supports 2 dataphase reads; SB-UMC 512-bit Read, which can be either 1 or 2 dataphases; UMC-MSMC 512 bit-Read and 512-bit Write, with Snoop and DMA transactions overlapped; MMU-UMC Page table walks from L2, and any DVM messages; and MMU-PMC µTLB miss to MMU.

The two PMC controllers 1511/1521 are identical and the features listed here are supported on both. L1P Cache 411 and 421 have these attributes: 32 KB L1P cache; 4-Way Set Associative; 64-byte cache line size; Virtually Indexed and Virtually Tagged (48-bit virtual address); two dataphase data return on misses from L2, for prefetching. PMC controllers 1511/1521 support Prefetch and Branch Prediction with the Capability to queue up to a variable number (up to 8) fetch packet requests to UMC to enable deeper prefetch in program pipeline. PMC controllers 1511/1521 include Error Detection (ECC) having: parity protection on Data and Tag RAMs: 1-bit error detection for tag and data RAMs; Data RAM parity protection is on instruction width granularity (1 parity bit every 32 bits); and Auto-Invalidate and Re-Fetch on errors in TAG RAM. PMC controllers 1511/1521 support Global Cache coherence operations. PMC controllers 1511/1521 provide Virtual Memory by Virtual to Physical addressing on misses and have a µTLB to handle address translation and for code protection. PMC controllers 1511/1521 provide Emulation including access codes that will be returned on reads to indicate the level of cache that the data was read from and bus error codes will be returned to indicate pass/fail status of emulation reads and writes. PMC controllers 1511/1521 provide Extended Control Register Access including L1P ECR registers accessible from the CPU through a non-pipelined interface. These registers will not be memory mapped, and instead will be mapped to a MOVC CPU instruction.

The two DMC controllers 1512/1522 are identical and the features listed here are supported on both. L1D Cache 412 and 422 are Direct Mapped Cache, in parallel with a 8/16 entry fully associative victim cache. L1D Cache 412 and 422 are 32 KB configurable down to 8 KB cache. L1D Cache 412 and 422 have a 128 byte cache line size. L1D Cache 412 and 422 are read Allocate Cache support for both Write-Back and Write-Through modes. L1D Cache 412 and 422 are Physically Indexed, Physically Tagged (44-bit physical address), support Speculative Loads, Hit under Miss, have posted write miss support and provide write Merging on all outstanding write transactions inside L1D. L1D Cache 412 and 422 support a FENCE operation on outstanding transactions.

The L1D SRAM part of L1D Cache 412 and 422 support L1D SRAM accesses from CPU and DMA and have limited size configurability on SRAM.

DMC controllers 1512/1522 include Lookup Table and Histogram capability to support 16 parallel table lookup and histogram.

DMC controllers 1512/1522 have 512-bit CPU Load/ Store Bandwidth, 1024 Bit L1D Memory bandwidth. DMC controllers 1512/1522 support 16 64-bit wide Banks with up to 8 outstanding load misses to L2.

DMC controllers 1512/1522 includes Error Detection and Correction (ECC). DMC controllers 1512/1522 supports ECC Detection and Correction on a 32-bit granularity. This includes Full ECC on Data and Tag RAMs with 1-bit error correction and 2-bit error detection for both. DMC controllers 1512/1522 provide ECC syndrome on writes and victims out to L2. DMC controllers 1512/1522 receive ECC syndromes with read data from L2, and will do detection and correction before presenting this data to CPU. DMC controllers 1512/1522 provides full ECC on victim cache. DMC controllers 1512/1522 provide read-modify-write support to prevent parity corruption on half-word or byte writes. The ECC L2-L1D interface delays correction for Read-Response data pipeline ECC protection.

DMC controllers 1512/1522 provide emulation by returning access codes on reads to indicate the level of cache that the data was read from. Bus error codes will be returned to indicate pass/fail status of emulation reads and writes.

DMC controllers 1512/1522 provide atomic operations on Compare and Swap to cacheable memory space and increment to cacheable memory space.

DMC controllers 1512/1522 provides coherence including fully MESI (modified, exclusive, shared, invalid) state support in both Main and Victim Cache. DMC controllers 1512/1522 support Global Cache coherence operations including snoops and Cache Maintenance operation support from L2, snoops for L2 SRAM, MSMC SRAM and External (DDR) addresses and full tag-RAM comparisons on Snoop and Cache Maintenance operations.

DMC controllers 1512/1522 provide virtual Memory support for wider (44 bit) physical address.

DMC controllers 1512/1522 support Extended Control Register Access. L1D ECR registers will be accessible from the CPU through a non-pipelined interface. These registers will not be memory mapped, and instead will be mapped to a MOVC CPU instruction.

UMC 1530 controls data flow into and out of L2 cache 431. L2 cache 431 is 8-Way Set Associative, supports cache sizes 64 KB to 1 MB. L2 cache 431 includes random least recently used (LRU). L2 cache 431 has a 128 byte cache line size. L2 cache 431 has a write-allocate policy and supports write-back and write-through modes. L2 cache 431 performs a cache Invalidate on cache mode change which is configurable and can be disabled. L2 cache 431 is physically Indexed, Physically Tagged (44-bit physical address) including 4 times banked TAG RAM's, which allow four independent split pipelines. L2 cache 431 supports 4 64 byte streams from two stream buffers, 2 L1D and 2 L1P caches and configuration and MDMA accesses on a unified interface to MSMC. L2 cache 431 caches MMU page tables.

The L2 SRAM part of L2 cache 431 is 4 by 512-bit physical banks with 4 virtual bank each. Each bank has independent access control. L2 SRAM includes a security Firewall on L2 SRAM accesses. L2 SRAM supports DMA access on a merged MSMC I/F.

UMC 1530 provides prefetch hardware and On-demand prefetch to External (DDR), MSMC SRAM and L2 SRAM.

UMC 1530 provides Error Detection and correction (ECC) on a 256-bit granularity. There is full ECC Support for both TAG and Data RAMS with 1-bit error correction and 2-bit error detection for both. UMC 1530 provides ECC syndrome on writes and victims out to MSMC. UMC 1530 Read-Modify-Writes on DMA/DRU writes to keep parity valid and updated. ECC Correction and generation of multiple parity bits to L1P and Stream Buffer. This includes an auto-scrub to prevent accumulation of 1-bit errors, and to refresh parity. This clears and resets parity on system reset.

UMC 1530 provide emulation by returning access codes on reads to indicate the level of cache that the data was read from. Bus error codes will be returned to indicate pass/fail status of emulation reads and writes.

UMC 1530 supports full Coherence between 2 L1Ds, 4 Streams, L2 SRAM, MSMC SRAM and External (DDR). This includes multiple L1D to shared L2 Coherence, snoops for L2 SRAM, MSMC SRAM and External (DDR) addresses. This coherence has full MESI support. UMC 1530 includes user Coherence commands from Stream Buffer and support for Global Coherence operations.

UMC 1530 supports Extended Control Register Access. L1D ECR registers will be accessible from the CPU through a non-pipelined interface. These registers will not be memory mapped, and instead will be mapped to a MOVC CPU instruction.

Figure 16:
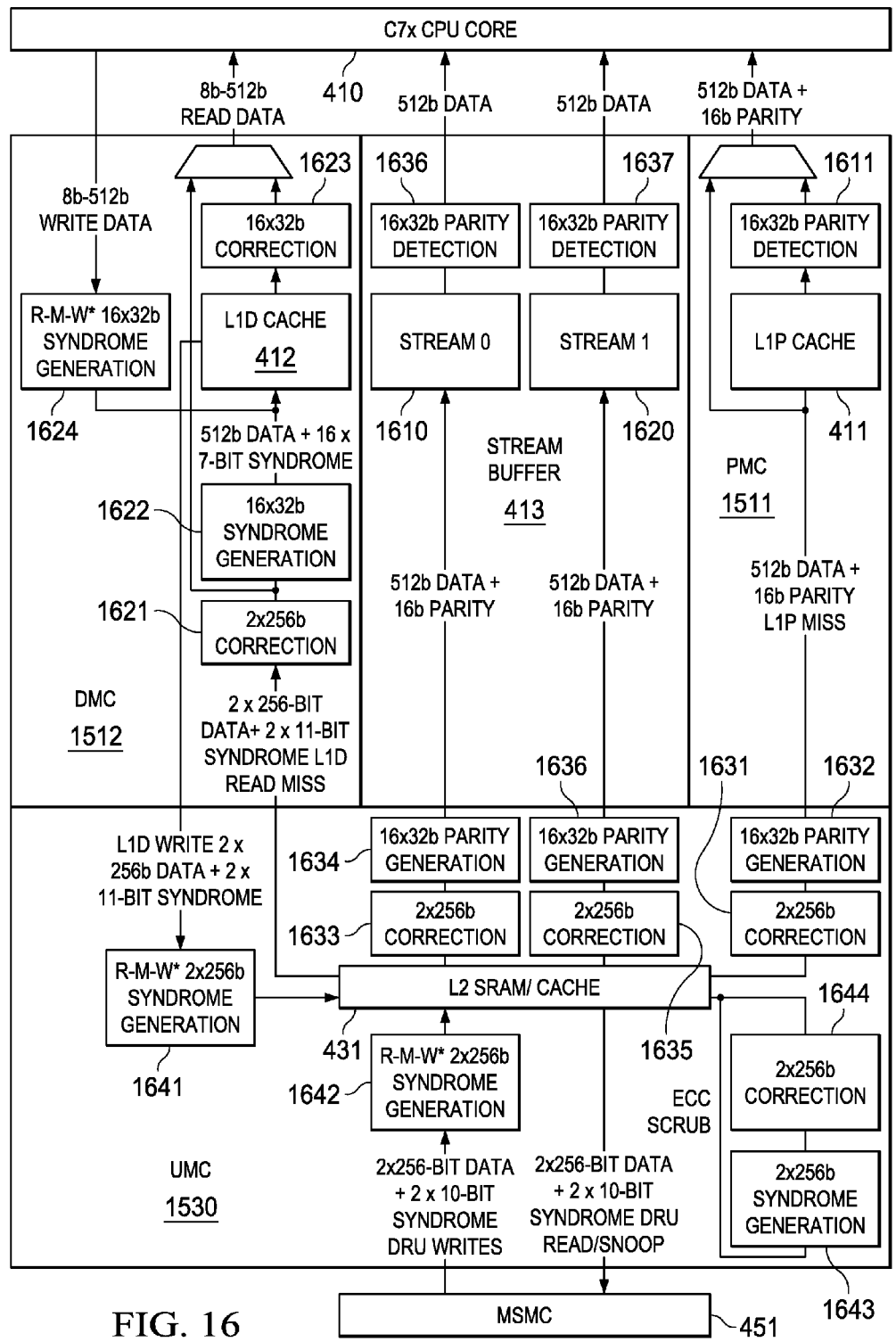
FIG. 16 illustrates the error detection and correction of this invention.

FIG. 16 illustrates the error detection and correction of this invention. Parts illustrated in FIGS. 4 and 15 are given the same reference numbers. FIG. 16 illustrates only one CPU core. The connections to the second core are identical. Illustration of the second core is omitted from FIG. 16 for simplicity.

L1P cache 411 receives data from L2 SRAM/cache 431 via 2 by 256 bit correction unit 1631 and 16 by 32 bit parity generator 1632. On supply of instructions to CPU core 410 the parity bits stored in L1P cache 411 are compared with newly calculated parity bits in 16 by 32 bit parity detector 1611. If they match the instructions are supplied to CPU core 410. If they do not match, the instructions are recalled from L2 SRAM/cache 431, then subject to the parity test again.

L1D cache 412 receives data from L2 SRAM/cache via 2 by 256 bit correction unit 1621 and 16 by 32 bit parity generator 1622. On supply of data to CPU core 410 the parity bits stored in L1D cache 412 are compared with newly calculated parity bits in 16 by 32 bit parity detector 1623. If they match the data is supplied to CPU core 410. If they do not match, the data is recalled from L2 SRAM/cache 431, then subject to the parity test again.

Writes from CPU core 410 are subject to parity generation in 16 by 32 bit syndrome generator 1624. The data received from CPU core 410 and the calculated parity bits are stored in L1D cache 412.

On write back from L1D cache 412 newly calculated parity bits and the stored parity are compared in 2 by 256 bit syndrome generator 2841 1641. If the match, the data is stored in L2 SRAM/cache 431. If they do not match, 2 by 256 bit syndrome generator 1641 attempts correction. If the correction is achieved, the data is stored in L2 SRAM/cache 431. Failure of correction generates a fault.

Stream buffer 413 includes two streams 1610 and 1620 which operate similarly. Stream 1610 receives data from L2 SRAM/cache via 2 by 256 bit correction unit 1633 and 16 by 32 bit parity generator 1634. On supply of data to CPU core 410 the parity bits stored in stream 1610 are compared with newly calculated parity bits in 16 by 32 bit parity detector 1631. If they match the data is supplied to CPU core 410. If they do not match, there is a fault. Stream 1620 receives data from L2 SRAM/cache via 2 by 256 bit correction unit 1635 and 16 by 32 bit parity generator 1636. On supply of data to CPU core 410 the parity bits stored in stream 1620 are compared with newly calculated parity bits in 16 by 32 bit parity detector 1632. If they match the data is supplied to CPU core 410. If they do not match, there is a fault.

L2 SRAM/cache 431 receives data from MSMC 451 via 2 by 256 bit syndrome generator 1641. New parity is generated for storage in L2 SRAM/cache 431 and correction is attempted if needed. Upon a non-match and failure of correction, the data is recalled from MSMC 451, then subject to the parity test again. There are no parity checks or correction on writes from L2 SRAM/cache 431 to MSMC 451.

The 2 by 256 bit syndrome generation 1643 and 2 by 256 correction 1644 periodically walk through the data stored in L2 SRAM/cache 431. The data and parity is recalled, new parity generated and checked and correction attempted if needed. If the data is correct, there is no change made in L2 SRAM/cache 431. If data is corrected, the corrected data is stored back in L2 SRAM/cache 431. Failure of data correction generates a fault.

Figure 17:
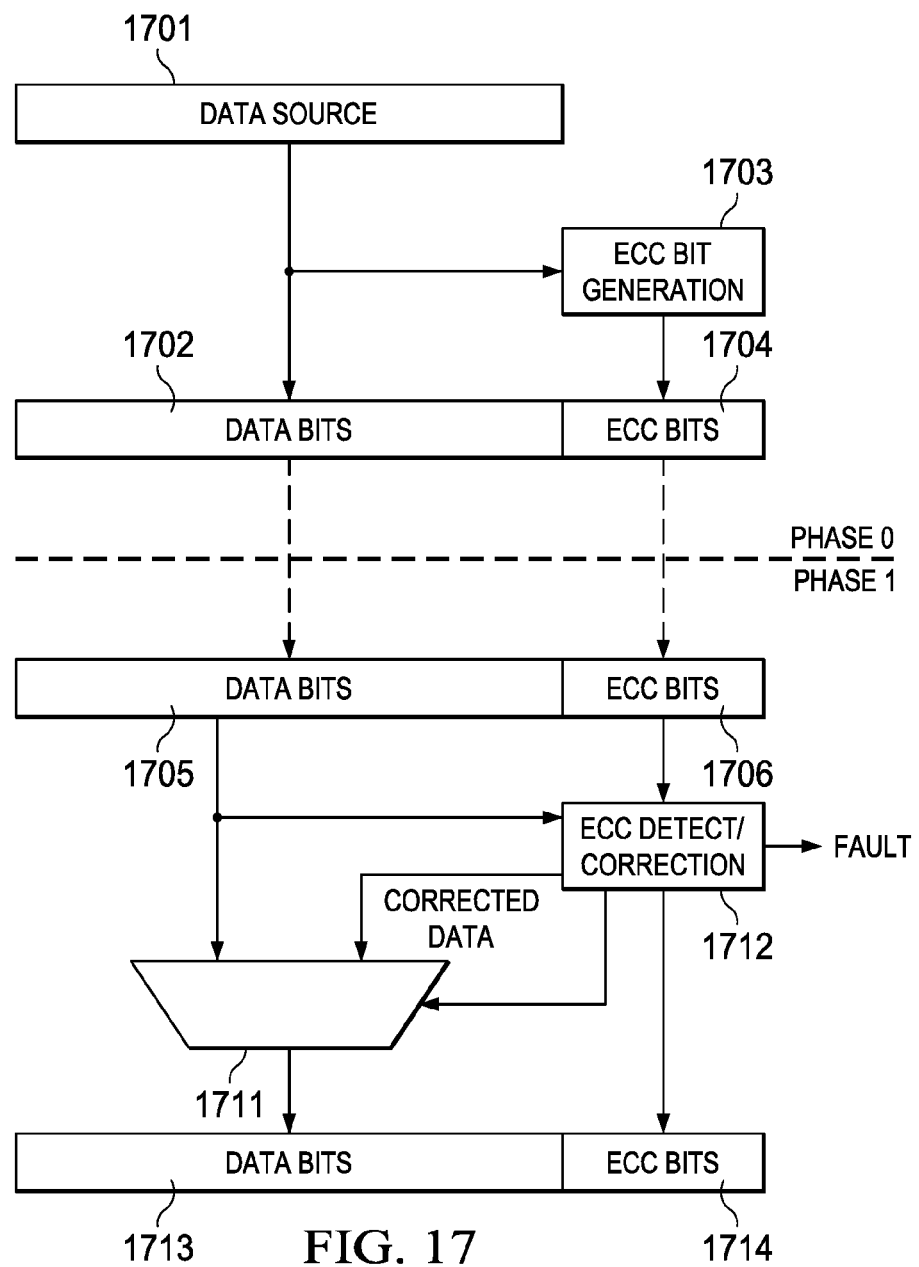
FIG. 17 illustrates the use of the error detection and correction of this invention in a pipelined system.

FIG. 17 illustrates using this invention in a pipelined system. Data source 1701 is the source of data to enter phase 0 of the pipelined system. Data source 1701 could be a register in another pipeline phase of the output of a functional unit. In this example data source 1701 supplies data bits only and does not supply ECC bits. The data bits are stored in register 1702 at the input of pipeline stage 0. Data bits from data source 1701 are also supplied to ECC bit generator 1703. ECC bit generator 1703 combines the data from data source 1701 to generate appropriate ECC bits according to the known art. In this example, ECC bit generator 1703 produces enough ECC bit to detect and correct one bit errors in the data stored in register 1702 and detect two bit errors. The ECC bits from ECC bit generator 1703 are stored in register 1704. Register 1704 is a companion to register 1702. In a practical embodiment of this invention registers 1702 and 1704 may be a combined register large enough to store the data bits and the corresponding ECC bits.

In this example the data stored in register 1702 is passed unchanged to register 1705 in normal operation. According to this invention, ECC bits stored in companion register 1704 are simultaneously stored in register 1706, which is a companion to register 1705. Registers 1705 and 1706 may be a combined register large enough to store the data bits and the corresponding ECC bits. Note that the ECC bits are not regenerated, they are passed unchanged from register 1704 to register 1706. FIG. 17 illustrates this connection in dashed lines. It is feasible to include plural combined registers storing the data and the non-recomputed ECC bits in this datapath.

Later in pipeline phase 1, the data in register 1705 passes to one input of multiplexer 1711. The ECC bits pass from register 1706 to Error detection/correction unit 1712. Error detection/correction unit 1712 also receives data from register 1705. Error detection/correction unit 1712 recalculates the ECC bits from the data from register 1705 and compares it with the ECC bits from register 1706. If these are identical, error detection/correction unit 1712 determines the data is correct. Error detection/correction unit 1712 signals multiplexer 1711 to select the data directly from register 1705 for storage in register 1713. In that case, error detection/correction unit 1712 supplies the corresponding ECC bits for storage in register 1714, which is a companion to register 1713. As previously noted, registers 1713 and 1714 may be embodied by a single appropriate appropriately sized register.

If the newly calculated ECC bits do not match the ECC bits received from register 1706, error detection/correction unit 1712 determines whether it can recover from the detected error. In this example the number of ECC bits enable detection and correction of single bit errors. If data recovery is possible, error detection/correction unit 1712 calculates the corrected data and supplies this corrected data to the second input of multiplexer 1711. Error detection/correction unit 1712 controls multiplexer 1711 to select this second input for storage in register 1713. Error detection/correction unit 1712 also supplies the correct ECC bits for storage in companion register 1714.

If error detection/correction unit 1712 cannot correct the detected data error (for example, two or more bits are incorrect), then error detection/correction unit 1712 signals an error condition via a fault. The pipeline system handles this error in a manner not relevant to this invention.

Existing solutions apply the detection and correction logic at the point when the data is read. The syndrome information is not carried forward with the data and is effectively lost. There is no protection for that data from that point until the syndrome is recomputed. Thus there are large pieces of the datapath susceptible to soft errors which are not protected. This invention tags the syndrome with the data and transmits it with the data through the system from the destination to the consumer. The entire datapath that carries the data with the syndrome thus receives soft error protection.

This invention does not need any special cells for the registers. This invention does not need multiple detection and correction or syndrome generation hardware. Registers throughout the datapath get soft error protection. This protection is of the same quality as the protection of memories. This has a very positive impact on the soft error protection of the device. The cycles spent in detection and correction at every level are avoided. This avoids any area or performance impact of adding ECC protection at every level.

What is claimed is:

1. A data processing apparatus comprising:
a data input for data of a predetermined width;
a first register connected to said data input for storing said data;
an error correction code generation unit connected to said data input for generating an error correction code corresponding to said data;
a second register corresponding to said first register connected to said error correction code generation unit for storing said error correction code;
a third register connected to said first register for storing data stored in said first register; and
a fourth register corresponding to said third register connected to said second register for storing said error correction code stored in said second register.

2. The data processing apparatus of claim 1, wherein:
said first register and said second register comprise a combined register having
a first section corresponding to said first register having a data width at least as great at said predetermined data width, and
a second section corresponding to said second register having a data width at least as great as a data width of said error correction code.

3. The data processing apparatus of claim 1, wherein:
said third register and said fourth register comprise a combined register having
a first section corresponding to said third register having a data width at least as great at said predetermined data width, and
a second section corresponding to said fourth register having a data width at least as great as a data width of said error correction code.

4. A data processing apparatus comprising:
a data input for data of a predetermined width;
a first register connected to said data input for storing said data;
an error correction code generation unit connected to said data input for generating an error correction code corresponding to said data;
a second register corresponding to said first register connected to said error correction code generation unit for storing said error correction code;
a third register connected to said first register for storing data stored in said first register;

a fourth register corresponding to said second register connected to said second register for storing said error correction code stored in said second register;

a multiplexer having a first input connected to said third register, a second input, a control input and an output, said multiplexer coupling said first input to said output or connecting said second input to said output dependent upon a signal received at said control input;

a fifth register connected to said output of said multiplexer for storing data output by said multiplexer;

a sixth register corresponding to said fifth register;

an error detect/correction unit connected to said third register, said fourth register, said sixth register and said multiplexer, said error detect/correction unit operable to generate a second error correction code corresponding to said data stored in said third register, compare said error correction code and said second error correction code;

if said error correction code matches said second error correction code, transmit a signal to said control input of said multiplexer to select said first input of said multiplexer and transmit said error correction code to said sixth register, and if said error correction code does not match said second error correction code, correct said data received from said third register if possible, transmit corrected data to said second input of said multiplexer, transmit a signal to said control input of said multiplexer to select said second input of said multiplexer, generate a regenerated error correction code corresponding to said corrected data and transmit said regenerated error correction code to said sixth register.

5. The data processing apparatus of claim 4, wherein:
said error detect/correction unit is further operable to generate a fault if said error correction code does not match said second error correction code and correction of said data received from said third register is not possible.

6. The data processing apparatus of claim 4, wherein:
said first register and said second register comprise a combined register having
 a first section corresponding to said first register having a data width at least as great at said predetermined data width, and
 a second section corresponding to said second register having a data width at least as great as a data width of said error correction code.

7. The data processing apparatus of claim 4, wherein:
said third register and said fourth register comprise a combined register having
 a first section corresponding to said third register having a data width at least as great at said predetermined data width, and
 a second section corresponding to said fourth register having a data width at least as great as a data width of said error correction code.

8. The data processing apparatus of claim 4, wherein:
said fifth register and said sixth register comprise a combined register having
 a first section corresponding to said fifth register having a data width at least as great at said predetermined data width, and
 a second section corresponding to said sixth register having a data width at least as great as a data width of said error correction code.

9. A data processing apparatus comprising:
a data input for data of a predetermined width;
a first register connected to said data input for storing said data;
an error correction code generation unit connected to said data input for generating an error correction code corresponding to said data;
a second register corresponding to said first register connected to said error correction code generation unit for storing said error correction code;
a third register connected to said first register for storing data stored in said first register;
a fourth register corresponding to said second register connected to said second register for storing said error correction code stored in said second register;
said data processing apparatus operates employing a pipeline having plural phases; and
said first register and said second register are in a first pipeline phase and said third register and said four register are in a second pipeline phase later than said first pipeline phase.

10. The data processing apparatus of claim 9, wherein:
said first register and said second register comprise a combined register having
 a first section corresponding to said first register having a data width at least as great at said predetermined data width, and
 a second section corresponding to said second register having a data width at least as great as a data width of said error correction code.

11. The data processing apparatus of claim 9, wherein:
said third register and said fourth register comprise a combined register having
 a first section corresponding to said third register having a data width at least as great at said predetermined data width, and
 a second section corresponding to said fourth register having a data width at least as great as a data width of said error correction code.

12. A method of data processing comprising the steps of:
receiving data of a predetermined width;
storing said data in a first register;
generating an error correction code corresponding to said received data;
storing said error correction code in a second register corresponding to said first register;
transferring data stored in said first register to a third register; and
transferring error correction code stored in a said second register to a fourth register corresponding to said third register.

13. A method of data processing comprising the steps of:
receiving data of a predetermined width;
storing said data in a first register;
generating an error correction code corresponding to said received data;
storing said error correction code in a second register corresponding to said first register;
transferring data stored in said first register to a third register;
transferring error correction code stored in a said second register to a fourth register corresponding to said third register;
generating a second error correction code corresponding to data stored in the third register,
comparing the error correction code and the second error correction code;

if the error correction code matches the second error correction code, transferring data in the third register to a fifth register and storing the error correction code in a sixth register, and if the error correction code does not match the second error correction code, correcting the data in said third register if possible, transferring corrected data to the fifth register, generating a regenerated error correction code corresponding to the corrected data and storing the regenerated error correction code to a sixth register.

14. The method of data processing of claim 13, further comprising the steps of:
generating a fault if the error correction code does not match the second error correction code and correction of said data received from said third register if not possible.

15. A method of data processing comprising the steps of:
receiving data of a predetermined width;
storing said data in a first register;
generating an error correction code corresponding to said received data;
storing said error correction code in a second register corresponding to said first register;
transferring data stored in said first register to a third register;
transferring error correction code stored in a said second register to a fourth register corresponding to said third register;
the first register and the second register are in a first pipeline phase and the third register and the fourth register are in a second later pipeline phase.

* * * * *